United States Patent [19]

Leavens et al.

[11] 4,064,117
[45] Dec. 20, 1977

[54] RECOVERY OF FATTY ACIDS FROM TALL OIL HEADS

[75] Inventors: Dwight Earl Leavens; Claude Frank Phillips, Jr., both of Panama City, Fla.

[73] Assignee: Sylvachem Corporation, Jacksonville, Fla.

[21] Appl. No.: 640,400

[22] Filed: Dec. 15, 1975

[51] Int. Cl.$^2$ ............................................. C09F 1/00
[52] U.S. Cl. ................... 260/97.6; 260/97.5; 260/97.7
[58] Field of Search ............................ 260/97.5, 97.6

[56] References Cited

U.S. PATENT DOCUMENTS

| 3,575,952 | 4/1971 | Morris et al. | 260/97.6 |
| 3,884,819 | 4/1974 | Wengrow | 260/97.6 |

*Primary Examiner*—Melvyn I. Marquis
*Assistant Examiner*—William Parker
*Attorney, Agent, or Firm*—Jerry K. Mueller, Jr.

[57] ABSTRACT

Process for treating tall oil heads with alkali at elevated temperature for recovery of heads fatty acids is improved by performing a fusion cook of such heads initiated with essentially dry alkali.

9 Claims, No Drawings

RECOVERY OF FATTY ACIDS FROM TALL OIL HEADS

BACKGROUND OF THE INVENTION

This invention relates to an improvement in process for recovering heads fatty acids from tall oil heads and more particularly to such process wherein said heads are treated with alkali.

In U.S. Pat. No. 3,887,537 it has been proposed to blend an aqueous solution of caustic soda with such heads and to heat the resulting mixture to a temperature of about 110° C. for about 20 minutes. The heated mixture then is passed into a thin film evaporator wherein retained water and unsaponifiables are distilled off. Typically, a sufficient proportion of alkali is used to fully neutralize the heads fatty acids present, and often a small excess of alkali beyond this. The aqueous caustic soda and heads form a fairly intractable mass in such initial cooking operation, tend to foam excessively, and display poor heat transfrer characteristics resulting in localized overheating and degradation of the soap. Additionally, a dehydrated solid bottoms may form which can compound the heat transfer problem. This makes the process laborious, difficult, slow, and frequently dangerous.

Advantages of the instant improvement include the formation of an easily handled and worked reaction mixture that is highly effective for the entire treatment and the eventual recovery purpose.

SUMMARY OF THE INVENTION

This improvement, in a process for treating tall oil heads with alkali at elevated temperature to yield a reaction mixture from which water vapor and unsaponifiables are removed as distillate and the resulting residue of alkali metal salts of heads fatty acids is hydrated for springing therefrom heads fatty acids, comprises: initiating formation of said reaction mixture with alkali metal agent of at most very low water content; and conducting said alkali treating with said alkali metal agent essentially as an alkali fusion cook.

DETAILED DESCRIPTION OF THE INVENTION

Alkali metal agent includes the hydroxide, oxide, carbonate, and bicarbonate of sodium and potassium. Advantageously, the alkali metal agent is alkali metal hydroxide and for efficiency and economy preferably it is sodium hydroxide (caustic soda) in solid lump or pellet form. Advantageously, the sodium hydroxide should have a purity of at least 80% with only incidental water of at most about 10% and generally lower, for example, 5 to 0%. The total water entering the initiation of the fusion cook from all sources--heads, caustic soda, and adventitious sources--should not be substantially more than about 12% of the total initial reaction mixture, and preferably not more than about 8% for suppressing intractability of the reaction mass. During fusion cook water is formed, and much of it distills off.

Definition of the following terms as used in this patent application is in order:

1. Tall Oil Heads: a distillation fraction of light boiling material obtained when tall oil is subjected to fractional distillation. Typically, it consists of a mixture of palmitic, oleic, and linoleic acids ranging from about 50 to 75%, the remainder generally consisting of unsaponifiable material. A substantial proportion of such unsaponifiable material has a boiling point very close to that of the fatty acids, thus rendering separation of fatty acids from unsaponifiable material by fractional distillation commercially unfeasible.

2. Unsaponifiables: that portion of head cuts, including impure organic acids, which will not react with an alkali metal agent when heated in a mutual solvent, usually ethyl alcohol or methyl alcohol. In the case of tall oil heads cuts, the unsaponifiables generally are believed to be long chain alcohols, aldehydes, rosin degradation products, and dimethoxystilbene.

3. Alkali metal agent: the hydroxide, oxide, carbonate, and bicarbonate of the metals sodium and potassium.

4. Alkali fusion cook: that chemical reaction wherein a fatty acid is reacted with an alkali metal agent at elevated temperature sans the addition of water to form (a) fatty metallic salt and water when the agent is an alkali metal hydroxide or oxide, or (b) the fatty metallic salt, water, and carbon dioxide when the alkali metal agent is an alkali metal carbonate or bicarbonate.

5. Heads fatty acid: the fatty acid typical of tall oil heads comprising largely palmitic, oleic, and linoleic acids.

6. Springing (acidulation): that chemical process wherein fatty acid salts are treated with a mineral acid to convert said salts to their corresponding fatty acids. A spent aqueous phase and a fatty acid phase will form upon springing water-insoluble fatty acids from their corresponding salts.

7. Hydrating: for present purposes, hydrating means dissolving the anhydrous fatty acid soap in water in preparation for springing their corresponding fatty acids.

Conditions for treating of tall oil heads in the instant alkali fusion cook are as follows: dry caustic is added to the tall oil heads at about 230°-260° C. and the fusion cook run for about one hour at atmospheric pressure. Preferably, a stoichiometric amount of caustic based on the acid number of the tall oil heads is used, though lesser amounts tend to give a purer product in the pot as residual free fatty acids distilled from the pot tend to carry over some of the unsaponifiables with them. While the pot temperature can range from about 100° C. to 300° C., temperatures of at least about 200° C. and preferably about 230° C.-260° C. tend to suppress foaming of the pot's contents and rid the product of the water of reaction. The reaction is essentially instantaneous, but reaction times of around 1 hour allow more water to be boiled off. Atmospheric pressure is preferred for the cook, though sub-atmospheric pressure also aids in ridding the pot of water.

Distillation of water occurs during the fusion cook at the preferred condition of atmospheric pressure operating. The water distillation can be finished efficiently and the unsaponifiables also distilled off by reducing the pressure to between 10 and 0.2 mm. mercury absolute while maintaining a distilland temperature of about 230° to 280° C.

Hydration of the residue alkali metal salts of heads fatty acids most readily is done by their slow admission into vigorously agitated hot water.

Springing of the heads fatty acids from the hydrated salts most readily is done with strong acid, advantageously, this is a mineral acid such as sulfuric acid or hydrochloric acid or the like, and preferably is sulfuric acid of about 9°-41° (Baume) or the like for efficiency and economy and low corrosiveness.

Materials of construction should be quite resistant to the substances being handled. Thus, advantageously, materials of construction for the fusion cook reactor and distillation include, for example, black iron and stainless steel; for the hydration black iron, stainless steel and glass; and for the acid springing stainless steel and glass.

The following example shows how this improvement has been practiced, but should not be construed as limiting the invention. In this specification all temperatures are in degrees Centigrade, all parts are parts by weight, and all percentages are weight percentages unless otherwise expressly indicated.

EXAMPLE

An alkali fusion cook of tall oil heads was performed by adding 500 grams of tall oil heads to a pot and heating them to 230° C. followed by addition of 44 grams of sodium hydroxide in pellet form (essentially 98% purity) during a ten-minute interval. The temperature of the pot then was raised to 260° C. and the reaction allowed to run for 50 minutes. Minor quantities of water initally entering the pot with the feed and most of the water formed during the alkali fusion cook distilled off during the reaction. Trace amounts of water were removed by reducing the pressure in the pot to 10 mm. mercury absolute for about 5 minutes.

The pot then contained heads fatty acids and unsaponifiable material as major components. The unsaponifiable material was distilled off by further reducing the pressure of the pot to 1 mm. mercury absolute at about 280° C. The residue, molten soap, was withdrawn from the pot and at a temperature of 260° C. was hydrated by dissolving the molten soap in hot water. The heads fatty acids were sprung from the molten soap by acidulating the hydrated soap with sulfuric acid to a final pH of 3.0, whereupon the heads fatty acids formed an upper raffinate layer which can be recovered by procedures commonly practiced in the fatty acids industry.

The anhydrous molten soap dissolves slowly in hot water and, thus, its simple addition to hot water for hydration is generally unsuitable for plant-scale operations. Alternatively, for efficient and economic plant-scale operation of the present invention, the molten soap can be hydrated by its addition at 260° C. to a pressure vessel capable of withstanding 600 psi internal pressure. Hot water is pumped into the pressurized vessel and the soap hydrated very rapidly.

The recovered heads fatty acids from the acidulation process was purified further by conventional vacuum stripping techniques to yeild a fatty acids product containing between 0.02 and .9% unsaponifiable material, with the Gardner color or 7–8and an acid number of 205–215. Further purification by standard acid clay treatment followed by vacuum stripping provided the product with a Gardner color of 3–4.

The recovered, purified heads fatty acids produced according to the present invention possess a low content of unsaponifiable material and substantially no rosin acids. Such recovered heads fatty acids can be sold in its recovered form or fractionated into acid cuts substantially of palmitic and oleiclinoleic fatty acids.

We claim:

1. In a process for treating tall oil heads with alkali at elevated temperature to yield a reaction mixture from which water vapor and unsaponifiable materials are removed as distillate and the resulting residue of alkali metal salts of heads fatty acids is hydrated for springing therefrom heads fatty acids, the improvement which comprises:

initiating formation of said reaction mixture with alkali metal agent of at most very low water content; and conducting said alkali treating with said alkali metal agent essentially as an alkali fusion cook.

2. The process of claim 1 wherein said alkali metal agent is alkali metal hydroxide.

3. The process of claim 2 wherein said alkali metal hydroxide is sodium hydroxide.

4. The process of claim 1 wherein said alkali fusion cook is conducted at a temperature of at least about 200° C.

5. The process of claim 1 wherein the water content of said alkali metal agent is less than about 10% by weight.

6. The process of claim 5 wherein said water content is less than about 5% by weight.

7. The process of claim 1 wherein the water content of the initially formed reaction mixture is not substantially greater than about 12% by weight thereof.

8. The process of claim 7 wherein said water content of said initially formed reaction mixture is not substantially greater than about 8% by weight thereof.

9. In a process for treating tall oil heads with alkali at elevated temperature to yield a reaction mixture from which water vapor and unsaponifiable materials are removed as distillate and the resulting residue of alkali metal salts of heads fatty acids is hydrated for springing therefrom heads fatty acids, the improvement which comrprises:

initiating formation of said reaction mixture with alkali metal agent containing less than about 10% water by weight, said initially formed reaction mixture containing not substantially more than about 12% water by weight; and conducting said alkali treating with said alkali metal agent essentially as an alkali fusion cook.

* * * * *